(12) United States Patent
Ryoo et al.

(10) Patent No.: US 9,625,259 B2
(45) Date of Patent: Apr. 18, 2017

(54) CLINOMETER AND METHOD FOR MEASURING STRIKE AND DIP ANGLE USING SAME

(71) Applicant: Korea Institute of Geoscience and Mineral Resources, Daejeon (KR)

(72) Inventors: Chung-Ryul Ryoo, Daejeon (KR); Hanyeang Lee, Daejeon (KR)

(73) Assignee: KOREA INSTITUTE OF GEOSCIENCE & MINERAL RESOURCES, Daejeon (KR)

( * ) Notice: Subject to any disclaimer, the term of this patent is extended or adjusted under 35 U.S.C. 154(b) by 128 days.

(21) Appl. No.: 14/407,183

(22) PCT Filed: Mar. 25, 2013

(86) PCT No.: PCT/KR2013/002453
§ 371 (c)(1),
(2) Date: Dec. 11, 2014

(87) PCT Pub. No.: WO2013/187584
PCT Pub. Date: Dec. 19, 2013

(65) Prior Publication Data
US 2015/0185004 A1 Jul. 2, 2015

(30) Foreign Application Priority Data
Jun. 12, 2012 (KR) .................. 10-2012-0062605

(51) Int. Cl.
*G01C 9/02* (2006.01)
*E02D 1/00* (2006.01)
*G01C 17/16* (2006.01)
*G01C 17/18* (2006.01)
*G01C 9/10* (2006.01)

(52) U.S. Cl.
CPC .............. *G01C 9/02* (2013.01); *E02D 1/00* (2013.01); *G01C 9/10* (2013.01); *G01C 17/16* (2013.01); *G01C 17/18* (2013.01)

(58) Field of Classification Search
CPC .......... G01C 9/10; G01C 17/16; G01C 17/18; G01C 9/02; E02D 1/00
USPC .............. 33/301, 316, 351–352, 354, 355 R, 33/356–357, 1 E
See application file for complete search history.

(56) References Cited

U.S. PATENT DOCUMENTS 559,090 A * 4/1896 West ........................ G01C 9/10
33/365
1,702,868 A * 2/1929 Hotchkiss et al. ..... G01C 17/16
324/259

(Continued)

FOREIGN PATENT DOCUMENTS

KR 20-0205063 9/2000
KR 20-0250394 9/2001

*Primary Examiner* — R. A. Smith
*Assistant Examiner* — Tania Courson
(74) *Attorney, Agent, or Firm* — Dentons US LLP

(57) ABSTRACT

A clinometer including a base plate and a compass which is mounted on the base plate and can measure a strike and a dip angle. The compass includes a first case which is rotationally provided on the base plate so as to move a strike scale indicated on the rim of the compass to a certain position and a second case which is provided in the first case, and which is fixed on the base plate so as to fix a dip scale indicated on the rim of the compass at a certain position.

8 Claims, 9 Drawing Sheets

(56) References Cited

U.S. PATENT DOCUMENTS

| | | | | |
|---|---|---|---|---|
| 2,141,173 A * | 12/1938 | Cordova | G01C 17/04 | 33/290 |
| 2,389,664 A * | 11/1945 | Giannini | G01C 17/00 | 33/346 |
| 2,878,578 A * | 3/1959 | Howard | G01O 5/00 | 33/352 |
| 2,914,862 A * | 12/1959 | Hendriks | G01C 17/16 | 33/301 |
| 3,142,122 A * | 7/1964 | Boepple | G01V 3/087 | 324/259 |
| 3,956,831 A * | 5/1976 | Sibley | G01C 17/16 | 33/352 |
| 4,095,348 A * | 6/1978 | Kramer | G01C 17/26 | 250/237 G |
| 4,438,568 A * | 3/1984 | Kramer | G01C 17/04 | 33/272 |
| 4,899,453 A * | 2/1990 | Bhat | G01C 17/04 | 33/272 |
| 4,905,377 A * | 3/1990 | Martinez | G01C 17/08 | 33/333 |
| 4,995,169 A * | 2/1991 | Lunden | G01B 11/26 | 250/237 G |
| 5,937,371 A * | 8/1999 | Gruetzmacher | G01C 9/12 | 33/308 |
| 6,243,660 B1 * | 6/2001 | Hsu | G01C 17/30 | 33/319 |
| 6,357,128 B1 * | 3/2002 | Iden | G01C 17/04 | 33/348 |
| 6,516,526 B1 * | 2/2003 | Iden | G01C 17/10 | 33/1 E |
| 6,701,631 B1 * | 3/2004 | Monteiro | G01C 17/00 | 33/1 E |
| 6,739,063 B2 * | 5/2004 | Chang | G10K 5/00 | 116/137 R |
| 6,853,918 B2 * | 2/2005 | Kozlowski | G01R 33/04 | 33/319 |
| 8,322,041 B1 * | 12/2012 | Iden | G01C 17/04 | 33/351 |
| 8,732,968 B2 * | 5/2014 | Kang | G01C 17/16 | 33/1 E |
| 9,222,774 B2 * | 12/2015 | Han | G01C 9/28 | |
| 9,354,053 B2 * | 5/2016 | You-Hong | G01C 9/02 | |
| 9,360,313 B2 * | 6/2016 | You-Hong | G01C 9/34 | |
| 2015/0377620 A1 * | 12/2015 | Heerschap | G01C 17/16 | 33/301 |

\* cited by examiner

CLINOMETER AND METHOD FOR MEASURING STRIKE AND DIP ANGLE USING SAME

CROSS-REFERENCE TO RELATED APPLICATION

This application is the Section 371 National Stage of PCT/KR2013/002453 filed Mar. 25, 2013, the entirety of which is incorporated herein by reference to the extent permitted by law. This application claims the benefit of priority to Korean Patent Application No. KR 10-2012-0062605, filed Jun. 12, 2012 the entirety of which is incorporated herein by reference to the extent permitted by law.

BACKGROUND OF THE INVENTION

The present invention relates to a clinometer and a method for measuring strike and dip angles by using the same, and more particularly, to a clinometer that is capable of easily measuring strike and dip angles of a stratum and a method for measuring strike and dip angles by using the same.

Clinometers are essential portable equipment in measuring of various geological structures (bedding, foliation, folding, jointing, faulting, and the like) of an outcrop in the geological investigation in the fields and sites and related industries.

FIG. 1 is a view of a clinometer according to the related art.

For example, Korean Patent Application No. 20-1998-0010738 discloses an auxiliary measurement mechanism of a clinometer. As illustrated in FIG. 1, the auxiliary measurement mechanism of the clinometer includes a rod 2 coupled to a lower portion of a main body 1 of the clinometer a, a ground tool 3 having measurement reference surfaces that correspond to a side surface 1a and bottom surface 1b which are measurement reference surfaces of the clinometer in a state where the ground tool 3 is coupled to a lower end of the rod 2 by a shaft 4, and a dip angle measurement scale 5 disposed on a rotation part of the ground tool 3. Thus, the auxiliary measurement mechanism may measure a small stratification plane that is narrow and recessed and a linear structure.

FIG. 2 is a perspective view a clinometer according to the related art.

Also, Korean Patent Application No. 20-2001-0016546 discloses a clinometer including a laser pointer. As illustrated in FIG. 2, a laser pointer 14 for outputting laser beam is attached to a clinometer, a switch 15 for controlling the laser pointer is attached to the clinometer, and a hook tool 16 is attached to a portion of the clinometer to easily perform construction for horizontal, vertical, and slope surfaces.

However, the clinometer according to the related art has a limitation in that strike and dip scales integrally rotate to measure a strike angle, and then the compass separately rotates to be set again for measuring a dip angle, thereby measuring the dip angle. In addition, a dip angle measurement needle provided in the clinometer may be malfunctioned during rotation thereof due to frication with a strike angle measurement needle or a rotation shaft to incorrectly measure a dip angle.

SUMMARY OF THE INVENTION

To solve the above-described limitation, an object of the present invention provides a clinometer in which a dip scale is previously fixed thereto to read a dip scale, which is indicated by a dip measurement ball, as it is when the dip angle is measured, thereby easily measuring the dip angle of a stratum and a method for manufacturing strike and dip angles by using the same.

To achieve the above-described object, a clinometer according to the present invention includes: a base plate; and a compass disposed on the base plate to measure strike and dip angles, wherein the compass includes: a first case rotatably disposed on the base plate to move a strike scale displayed on a rim of the compass to a specific position; and a second case disposed within the first case, the second case being fixed to the base plate to previously fix a dip scale displayed on the rim of the compass at a specific position.

Also, the second case may includes: a strike measurement needle rotating a magnetic force to indicate the strike scale; and a dip measurement ball moving by the gravity to indicate the dip scale.

Also, the dip measurement ball may be formed of a copper material.

Also, the second case may be filled within a transparent inducing solution that prevents the strike measurement needle from vertically moving to induce horizontal rotation of the strike measurement needle.

Also, the dip scale may be displayed on a semicircular rim, and each of both ends of a horizontal line that is perpendicular to both side surfaces that correspond to the longitudinal axis of the base plate may be defined as an angle of 0°, an angle may gradually increase in a direction of a lower end of a vertical line that is perpendicular to the horizontal line, and the lower end of the vertical line may be defined as an angle of 90°.

Also, the clinometer may further include a level disposed on the base plate to adjust horizontality of the base plate.

Also, the level may be provided as a tube-type bubble tube that adjusts the horizontality of the base plate through movement of a bubble.

Also, rubbers having divisions different from each other may be displayed on both sides of the base plate, respectively.

Also, a clinometer according to the present invention includes: a base plate; a compass disposed on the base plate to measure strike and dip angles; a level disposed on the base plate to adjust horizontality of the base plate; and a cover connected to an end of the base plate through a hinge to cover the compass and the level, wherein the compass includes: a first case rotatably disposed on the base plate to move a strike scale displayed on a rim of the compass to a specific position; and a second case disposed within the first case, the second case being fixed to the base plate to previously fix a dip scale displayed on the rim of the compass at a specific position and indicate the dip scale by using a dip measurement ball that moves by the gravity.

Also, the cover may include a reflector for determining the strike and dip angles measured by the compass.

Also, a method for measuring strike and dip angles according to the present invention includes: contacting one side surface that corresponds to a longitudinal axis of a base plate to a bedding plane while maintaining horizontality of the base plate by using a level; rotating a first case on the base plate to move a strike scale displayed on a rim of a compass to a specific position and read a strike scale indicated by a strike measurement needle that rotates by a magnetic force, thereby measuring a strike angle of a bedding plane; contacting the one side surface that corresponds to the longitudinal axis of the base plate to the bedding plane in a direction perpendicular to the strike direction; and reading a dip scale, which is indicated by a dip measurement ball that moves by the gravity within a second case in which the strike scale is previously fixed, as it is to measure a dip angle.

Also, a method for measuring strike and dip angles according to the present invention includes: contacting one side surface that corresponds to a longitudinal axis of a base plate to a bedding plane while maintaining horizontality of the base plate by using a level; rotating a first case on the base plate to move a strike scale displayed on a rim of a compass to a specific position and read a strike scale indicated by a strike measurement needle that rotates by a magnetic force, thereby measuring a strike angle of a bedding plane; determining the strike angle through a reflector by rotating a cover when the strike angle is not visualized in the measuring of the strike angle; contacting the one side surface that corresponds to the longitudinal axis of the base plate to the bedding plane in a direction perpendicular to the strike direction; reading a dip scale, which is indicated by a dip measurement ball that moves by the gravity within a second case in which the strike scale is previously fixed, as it is to measure a dip angle; and determining the dip angle through the reflector by rotating the cover when the dip angle is not visualized in the measuring of the dip angle.

As described above, according to the clinometer and the method for measuring the strike and dip angles by using the same, the dip scale may be previously fixed to the clinometer to read a dip scale, which is indicated by the dip measurement ball, as it is when the dip angle is measured, thereby easily measuring the dip angle of the stratum.

Also, according to the present invention, the dip measurement ball that moves by the gravity to measure the dip angle may be provided to improve the malfunction of the conventional dip angle measurement needle due to the friction thereof.

DESCRIPTION OF THE CODE FOR THE MAIN PART OF THE DRAWING

Figure 1:
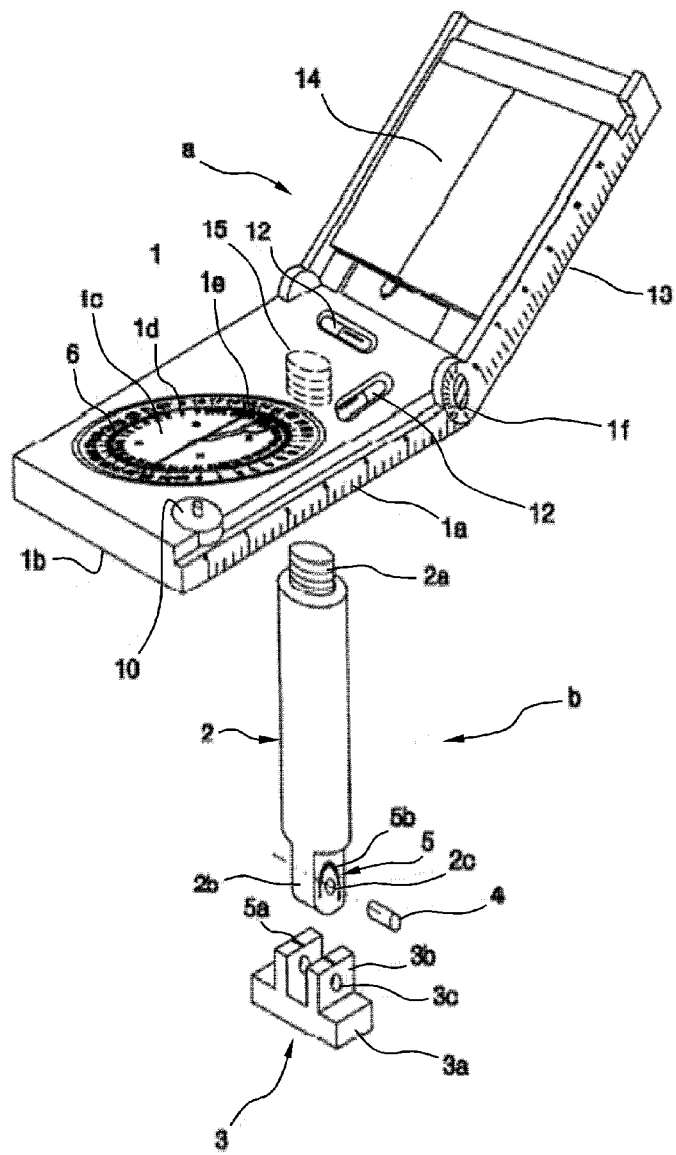
FIG. 1 is a view of a clinometer according to the related art.
Figure 2:
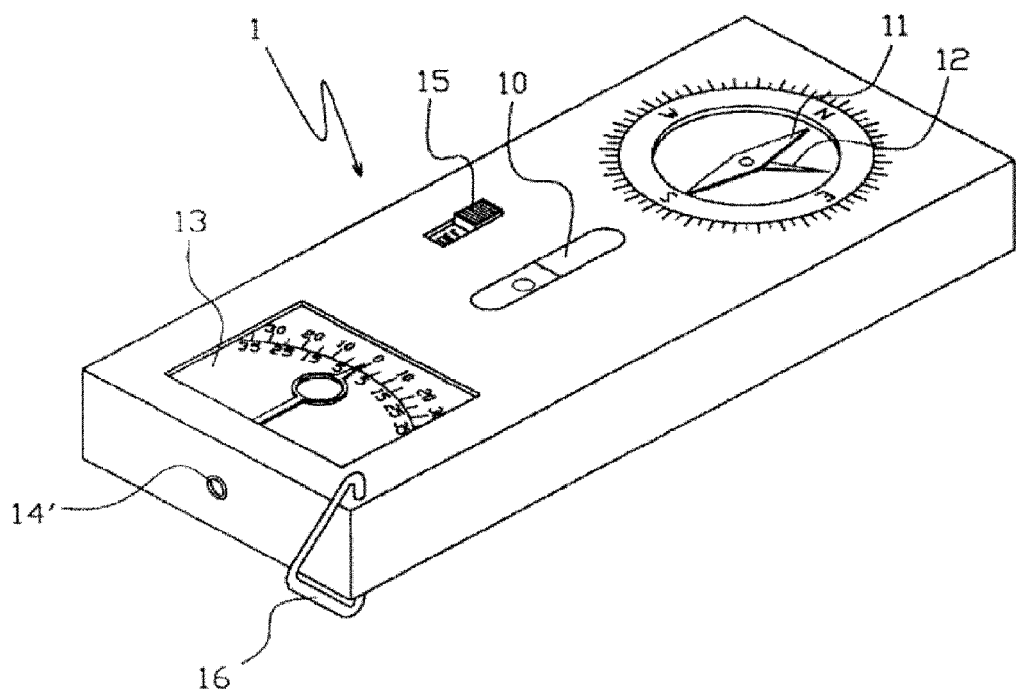
FIG. 2 is a perspective view the clinometer according to the related art.

1: Clinometer
100: Base plate 110: Convex mirror
120: Friction member 200: Compass
210: First case 211: Strike scale
220: Second case 221: Dip scale
222: Strike measurement needle 223: Dip measurement ball
300: Level 310: Bubble
400, 500: Ruler 600: Cover
610: Reflector 700: Hinge
S10: Horizontal contact process
S20: Strike measurement process
S25: Strike determination process
S30: Vertical contact process
S40: Dip angle measurement process
S50: Dip angle determination process

DETAILED DESCRIPTION OF THE PRESENTLY PREFERRED EMBODIMENTS

Hereinafter, embodiments of the present invention will be described in detail with reference to the accompanying drawings. It is also noted that like reference numerals denote like elements in appreciating the drawings. Moreover, detailed descriptions related to well-known functions or configurations will be ruled out in order not to unnecessarily obscure subject matters of the present invention.

Figure 3:
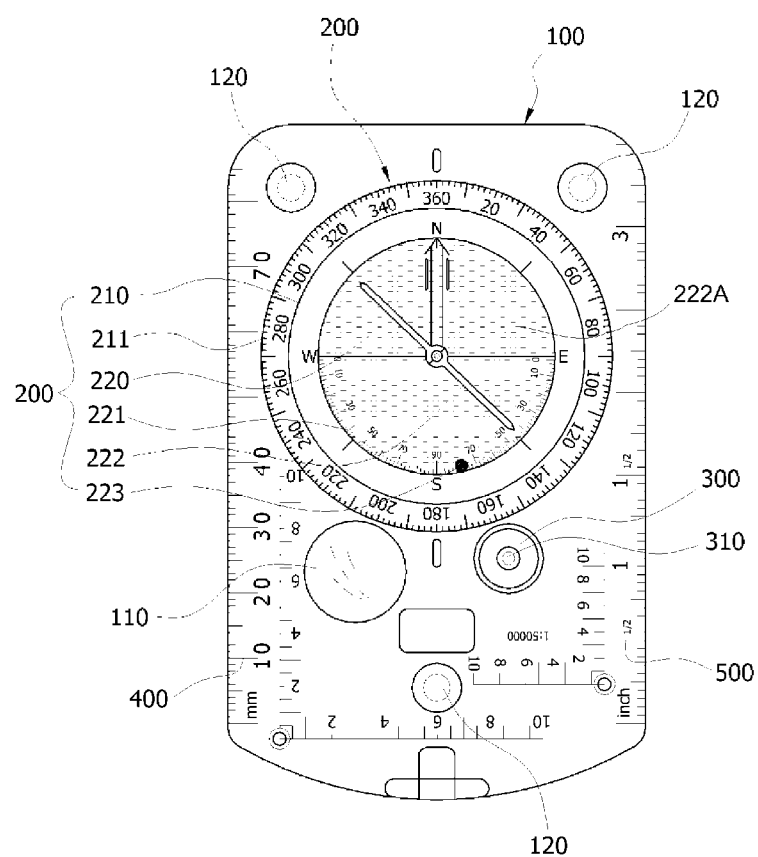
FIG. 3 is a view of a clinometer according to a first embodiment of the present invention.

FIG. 3 is a view of a clinometer according to a first embodiment of the present invention.

As illustrated in FIG. 3, a clinometer according to a first embodiment of the present invention includes a base plate 100, a compass 200 disposed on the base plate 100, and a level 300 disposed on the base plate 100 to adjust horizontality of the base plate 100.

The base plate 100 may be formed of a transparent material. Also, rulers having divisions different from each other may be disposed on both sides of the base plate 100, respectively.

Particularly, a ruler 400 having a millimeter (mm) unit may be disposed on one side of the base plate 100, and a ruler 500 having an inch unit may be displayed on the other side of the base plate 100 to measure sizes and widths of a plurality of joint walls existing in a stratum by units different from each other.

Also, the base plate 100 may include a convex mirror 110. Thus, various sedimentary structures in the stratum may be observed by using the convex mirror 110.

Furthermore, a friction member 120 may be disposed on a bottom surface of the base plate 100. For example, when the sedimentary structure is observed by using the convex mirror 110, since the friction member 120 prevents the base plate 100 from being slid along the stratum, the stratum may be easily observed.

The compass 200 may measure strike and dip angles of the stratum. Here, the compass 200 includes a first case 210 and a second case 220 disposed within the first case 210.

The first case 210 may be rotatably disposed on the base plate 100 to move a strike scale 211 displayed on the rim of the compass 200 to a specific position, thereby measuring a strike angle of the stratum.

Figure 5:
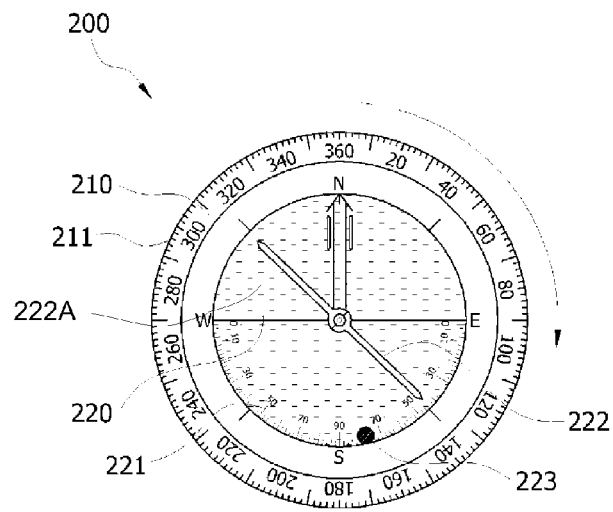
FIG. 5 is a view illustrating a state in which a strike angle is measured by using a clinometer according to the first embodiment of the present invention.
Figure 5:
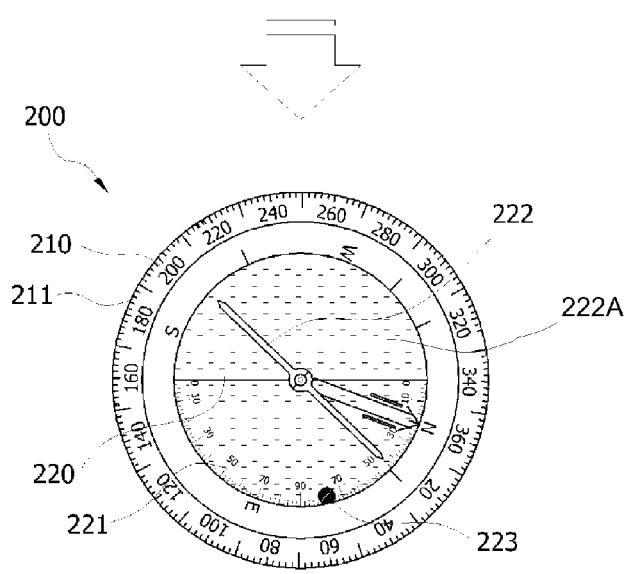

FIG. 5 is a view illustrating a state in which the strike angle is measured by using the clinometer according to the first embodiment of the present invention.

Particularly, the first case 210 may be provided as a rotational dial on which the strike scale 211 is displayed. To measure the strike angle of the stratum, one side surface that corresponds to a longitudinal axis of the base plate 100 may contact a bedding plane while maintaining the base plate 100 in a horizontal state. The, as illustrated in FIG. 5, the first case 210 may rotate to move the strike scale 211 displayed on the rim of the compass 200 and then read a strike scale indicated by a strike measurement needle 222 that rotates by a magnetic force, thereby measuring the strike angle of the stratum.

The second case 220 may be fixed to the base plate 100 to previously fix the dip scale 221 displayed on the rim of the compass 200 at a specific position, thereby measuring the strike angle of the stratum.

Particularly, the second case 220 may not be rotatably disposed on the base plate 100, but be fixed in position to the base plate 100 to prevent the dip scale 221 from moving, unlike the first case 210. Although not shown, a connection member (not shown) for relatively rotating the first case 210 regardless of the second case 220 may be disposed between the first and second cases 210 and 220.

Figure 4:
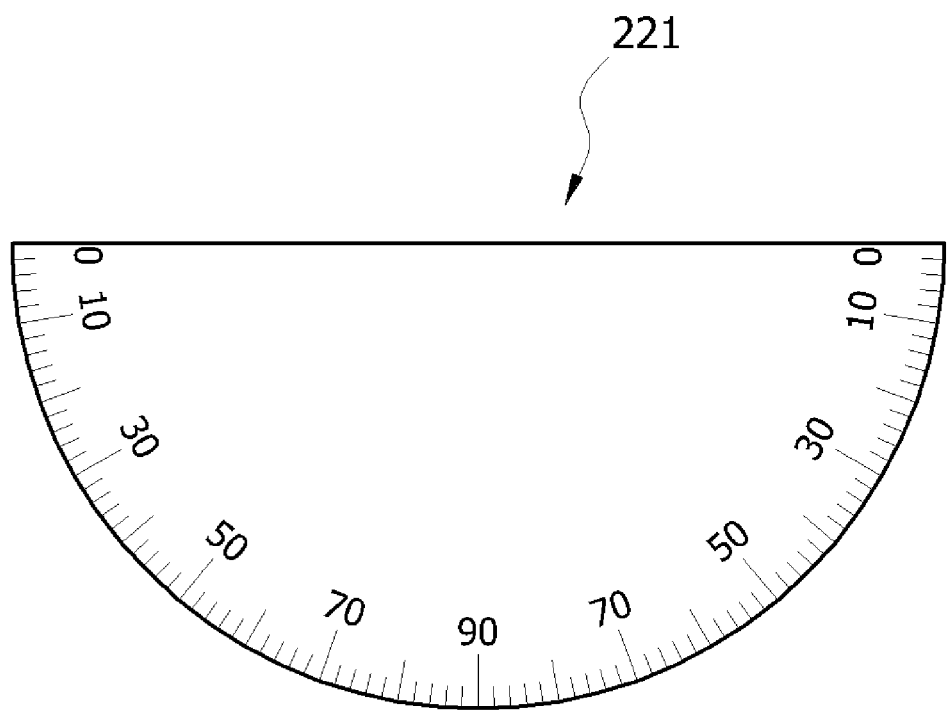
FIG. 4 is a view of a strike scale according to the present invention.

FIG. 4 is a view of a strike scale according to the present invention.

Here, as illustrated in FIG. 4, the dip scale 221 may be displayed on a semicircular rim. Each of both ends of a horizontal line that is perpendicular to both side surfaces that correspond to the longitudinal axis of the base plate 100 may be defined as an angle of 0°, an angle may gradually increase in a direction of a lower end of a vertical line that is perpendicular to the horizontal line, and the lower end of the vertical line may be defined as an angle of 90°.

The second case 220 may include the strike measurement needle 222 rotating by the magnetic force to indicate the strike scale 211 and a dip measurement ball 223 moving by the gravity to indicate the dip scale 221.

Since the strike measurement needle 222 has a vertical space with in the second case 220, when the strike measurement needle 222 rotates, the strike measurement needle may vertically move to continuously generate vertical vibration. Thus, the second case 220 may be filled with a transparent inducing solution 222A for preventing the strike measurement needle 222 from vertically moving to induce horizontal rotation of the strike measurement needle 222.

The dip measurement ball 223 may be formed of a copper material that does not have an influence with the magnetic force. The dip angle measurement needle provided in the compass according to the related art may be malfunctioned by the friction with the strike measurement needle or the rotation shaft to incorrectly measure a dip angle when the dip angle measurement needle rotates. However, according to the present invention, the dip measurement ball 223 that moves by the gravity may be provided to improve accuracy in measurement of the dip angle.

Figure 6:
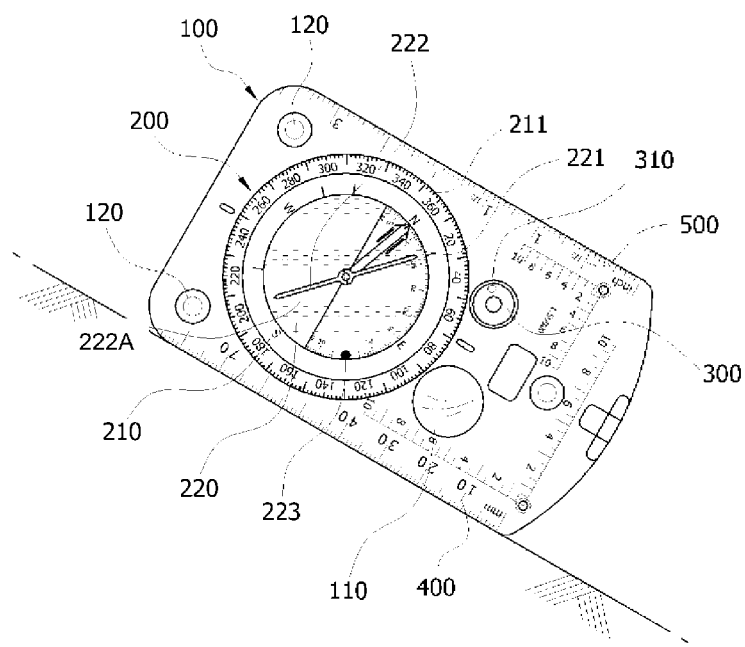
FIG. 6 is a view illustrating a state in which a dip angle is measured by using the clinometer according to the first embodiment of the present invention.

FIG. 6 is a view illustrating a state in which a dip angle is measured by using the clinometer according to the first embodiment of the present invention.

Particularly, to measure the dip angle of the stratum by using the clinometer according to the first embodiment of the present invention, as illustrated in FIG. 6, the one side surface that corresponds to the longitudinal axis of the base plate 100 may contact the bedding plane in a direction perpendicular to the strike direction and then read a strike scale, which is indicated by the dip measurement ball 223 that moves by the gravity within the second case 220, as it is, thereby measuring the dip angle of the stratum.

That is, in the compass according to the related art, the strike scale and the dip scale integrally rotate to measure the strike angle, and then the compass separately rotates to be set again for measuring the dip angle. However, according to the present invention, since the dip scale 221 is previously fixed within the second case 220, when the dip angle is measured after the strike angle is measured, the dip scale 221 indicated by the dip measurement ball 223 may be merely read as it is without performing the separate set-up. Thus, the dip angle of the stratum may be easily measured.

The level 300 may be provided as a tube-type bubble tube that is capable of adjusting the horizontality of the base plate 100 by using movement of a bubble.

Here, the tube-type bubble tube may be manufactured by sealing a liquid and a bubble 310 within a glass tube or a glass container having an air bubble shape and then being fixed to the base plate 100. Thus, the bubble 310 may move to a center of the tube to adjust the horizontality of the base plate 100.

Hereinafter, embodiments of the present invention will be described in detail with reference to the accompanying drawings. It is also noted that like reference numerals denote like elements in appreciating the drawings. Moreover, detailed descriptions related to well-known functions or configurations will be ruled out in order not to unnecessarily obscure subject matters of the present invention.

FIG. 3 is a view of a clinometer according to a first embodiment of the present invention.

As illustrated in FIG. 3, a clinometer according to a first embodiment of the present invention includes a base plate 100, a compass 200 disposed on the base plate 100, and a level 300 disposed on the base plate 100 to adjust horizontality of the base plate 100.

The base plate 100 may be formed of a transparent material. Also, rulers having divisions different from each other may be disposed on both sides of the base plate 100, respectively.

Particularly, a ruler 400 having a millimeter (mm) unit may be disposed on one side of the base plate 100, and a ruler 500 having an inch unit may be displayed on the other side of the base plate 100 to measure sizes and widths of a plurality of joint walls existing in a stratum by units different from each other.

Also, the base plate 100 may include a convex mirror 110. Thus, various sedimentary structures in the stratum may be observed by using the convex mirror 110.

Furthermore, a friction member 120 may be disposed on a bottom surface of the base plate 100. For example, when the sedimentary structure is observed by using the convex mirror 110, since the friction member 120 prevents the base plate 100 from being slid along the stratum, the stratum may be easily observed.

The compass 200 may measure strike and dip angles of the stratum. Here, the compass 200 includes a first case 210 and a second case 220 disposed within the first case 210.

The first case 210 may be rotatably disposed on the base plate 100 to move a strike scale 211 displayed on the rim of the compass 200 to a specific position, thereby measuring a strike angle of the stratum.

FIG. 5 is a view illustrating a state in which the strike angle is measured by using the clinometer according to the first embodiment of the present invention.

Particularly, the first case 210 may be provided as a rotational dial on which the strike scale 211 is displayed. To measure the strike angle of the stratum, one side surface that corresponds to a longitudinal axis of the base plate 100 may contact a bedding plane while maintaining the base plate 100 in a horizontal state. The, as illustrated in FIG. 5, the first case 210 may rotate to move the strike scale 211 displayed on the rim of the compass 200 and then read a strike scale indicated by a strike measurement needle 222 that rotates by a magnetic force, thereby measuring the strike angle of the stratum.

The second case 220 may be fixed to the base plate 100 to previously fix the dip scale 221 displayed on the rim of the compass 200 at a specific position, thereby measuring the strike angle of the stratum.

Particularly, the second case 220 may not be rotatably disposed on the base plate 100, but be fixed in position to the base plate 100 to prevent the dip scale 221 from moving, unlike the first case 210. Although not shown, a connection member (not shown) for relatively rotating the first case 210 regardless of the second case 220 may be disposed between the first and second cases 210 and 220.

FIG. 4 is a view of a strike scale according to the present invention.

Here, as illustrated in FIG. 4, the dip scale 221 may be displayed on a semicircular rim. Each of both ends of a horizontal line that is perpendicular to both side surfaces that correspond to the longitudinal axis of the base plate 100 may be defined as an angle of 0°, an angle may gradually increase in a direction of a lower end of a vertical line that is perpendicular to the horizontal line, and the lower end of the vertical line may be defined as an angle of 90°.

The second case 220 may include the strike measurement needle 222 rotating by the magnetic force to indicate the strike scale 211 and a dip measurement ball 223 moving by the gravity to indicate the dip scale 221.

Since the strike measurement needle 222 has a vertical space with in the second case 220, when the strike measurement needle 222 rotates, the strike measurement needle may vertically move to continuously generate vertical vibration. Thus, the second case 220 may be filled with a transparent inducing solution 222A for preventing the strike measurement needle 222 from vertically moving to induce horizontal rotation of the strike measurement needle 222.

The dip measurement ball 223 may be formed of a copper material that does not have an influence with the magnetic force. The dip angle measurement needle provided in the compass according to the related art may be malfunctioned by the friction with the strike measurement needle or the rotation shaft to incorrectly measure a dip angle when the dip angle measurement needle rotates. However, according to the present invention, the dip measurement ball 223 that moves by the gravity may be provided to improve accuracy in measurement of the dip angle.

FIG. 6 is a view illustrating a state in which a dip angle is measured by using the clinometer according to the first embodiment of the present invention.

Particularly, to measure the dip angle of the stratum by using the clinometer according to the first embodiment of the present invention, as illustrated in FIG. 6, the one side surface that corresponds to the longitudinal axis of the base plate 100 may contact the bedding plane in a direction perpendicular to the strike direction and then read a strike scale, which is indicated by the dip measurement ball 223 that moves by the gravity within the second case 220, as it is, thereby measuring the dip angle of the stratum.

That is, in the compass according to the related art, the strike scale and the dip scale integrally rotate to measure the strike angle, and then the compass separately rotates to be set again for measuring the dip angle. However, according to the present invention, since the dip scale 221 is previously fixed within the second case 220, when the dip angle is measured after the strike angle is measured, the dip scale 221 indicated by the dip measurement ball 223 may be merely read as it is without performing the separate set-up. Thus, the dip angle of the stratum may be easily measured.

The level 300 may be provided as a tube-type bubble tube that is capable of adjusting the horizontality of the base plate 100 by using movement of a bubble.

Here, the tube-type bubble tube may be manufactured by sealing a liquid and a bubble 310 within a glass tube or a glass container having an air bubble shape and then being fixed to the base plate 100. Thus, the bubble 310 may move to a center of the tube to adjust the horizontality of the base plate 100.

Hereinafter, a clinometer according to a second embodiment of the present invention will be described in detail.

Figure 7:
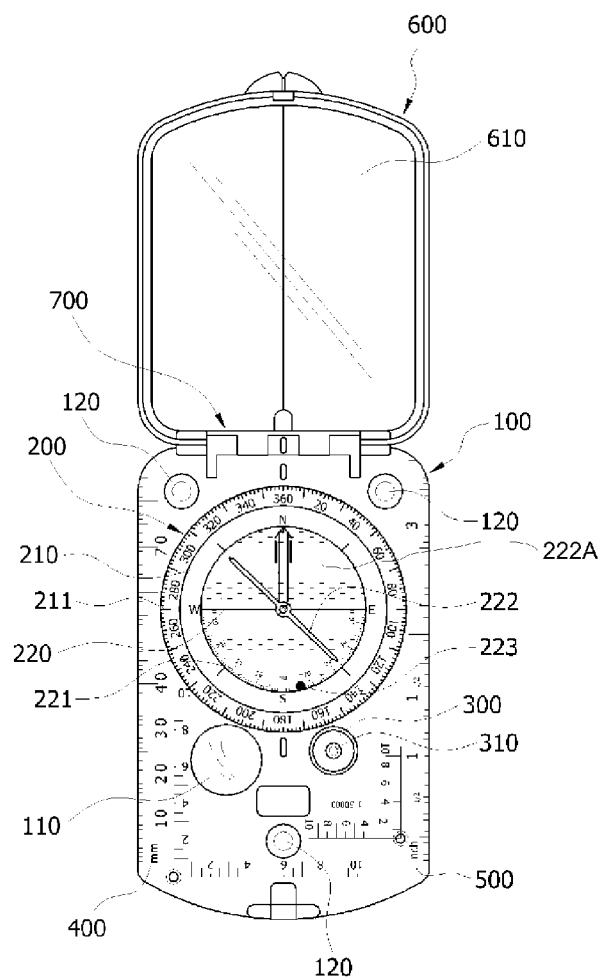
FIG. 7 is a view of a clinometer according to a second embodiment of the present invention.

FIG. 7 is a view of a clinometer according to a second embodiment of the present invention.

As illustrated in FIG. 7, a clinometer according to a second embodiment of the present invention includes a base plate 100, a compass 200 disposed on the base plate 100 to measure strike and dip angles, a level 300 disposed on the base plate 100 to adjust horizontality of the base plate 100, and a cover 600 connected to an end of the base plate 100 through a hinge 700 to cover the compass 200 and the level 300.

Since the base plate 100, the compass 200, and the level 300 have the same constitution and configuration as those of the base plate, the compass, and the level of the clinometer according to the first embodiment, respectively, their detailed descriptions will be omitted.

The cover 600 may include a reflector 610 for determining strike and dip angles measured by the compass 200. Particularly, when the strike and dip angles of a stratum, if it is difficult to directly determine the strike and dip angles through the compass 200, the cover 600 may rotate to determine the strike and dip angles through the reflector 610.

Hereinafter, a method for measuring the strike and dip angles according to the first embodiment of the present invention will be described in detail.

Figure 8:
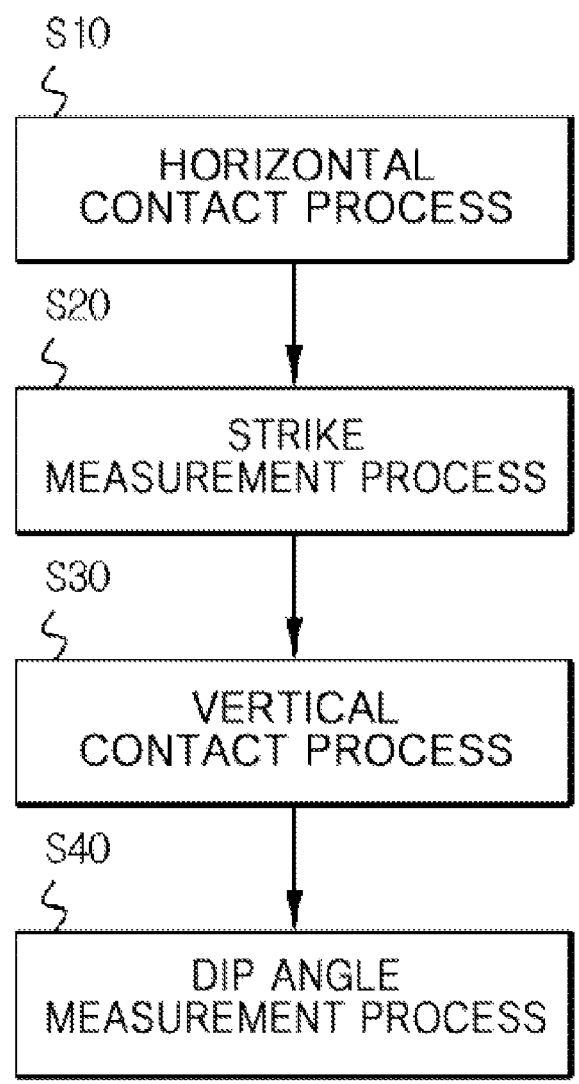
FIG. 8 is a block diagram illustrating a method for measuring strike and dip angles according to the first embodiment of the present invention.

FIG. 8 is a block diagram illustrating a method for measuring the strike and dip angles according to the first embodiment of the present invention.

As illustrated in FIG. 8, a method for measuring the strike and dip angles according to the first embodiment of the present invention may includes a horizontal contact process (S10), a vertical contact process (S30), and a strike angle measurement process (S40).

As illustrated in FIG. 3, the horizontal contact process (S10) may be a process for allowing one side surface that corresponds to a longitudinal axis of a base plate 100 to contact a bedding plane while maintaining horizontality of the base plate 100 by using a level 300.

The strike measurement process (S20) may be a process of rotating a first case 210 of a compass 200 to move a strike scale 211 displayed on a rim of the compass 200 to a specific position and then read a strike scale indicated by a strike measurement needle 222 that rotates by a magnetic force, thereby measuring a strike angle of the bedding plane.

As illustrated in FIG. 6, the vertical contact process (S30) may be a process for allowing the one side surface that corresponds to the longitudinal axis of the base plate 100 to contact the bedding plane in a direction perpendicular to the strike direction.

The dip angle measurement process (S40) may be a process for reading a dip scale 221, which is indicated by a dip measurement ball 223 that moves by the gravity within the second case 220 in which the dip scale 221 is previously fixed, as it is to measure a dip angle of the bedding plane.

Hereinafter, a method for measuring the strike and dip angles according to the second embodiment of the present invention will be described in detail.

Figure 9:
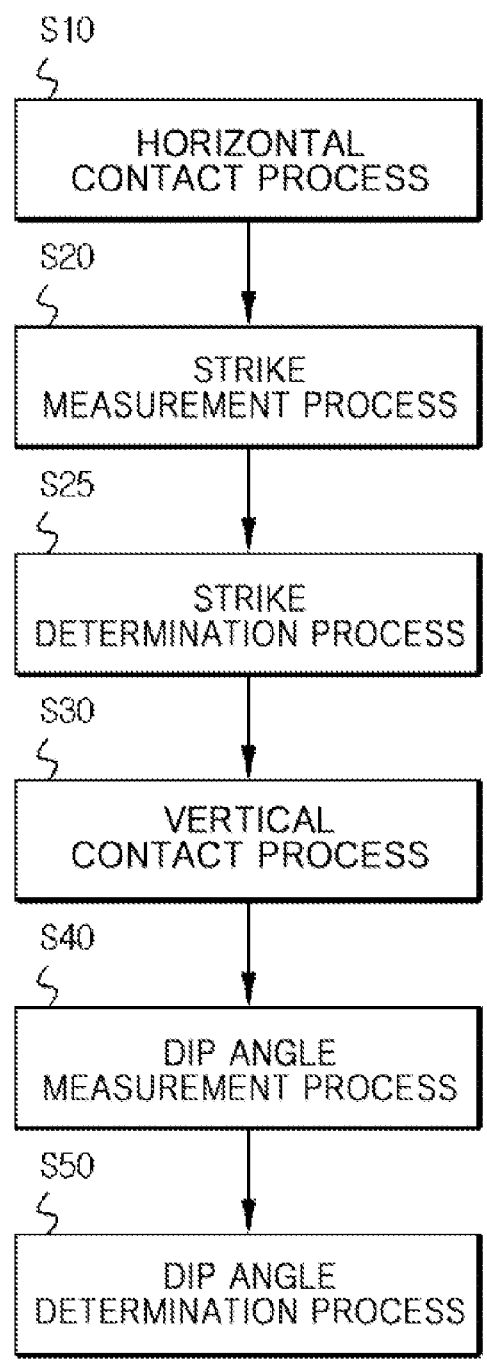
FIG. 9 is a block diagram illustrating a method for measuring strike and dip angles according to the second embodiment of the present invention.

FIG. 9 is a block diagram illustrating a method for measuring strike and dip angles according to a second embodiment of the present invention.

As illustrated in FIG. 9, a method for measuring strike and dip angles according to the second embodiment of the present invention may include a horizontal contact process (S10), a strike measurement process (S20), a vertical contact process (S30), a dip angle measurement process (S40), and a dip angle determination process (S50).

As illustrated in FIG. 7, the horizontal contact process (S10) may be a process for allowing one side surface that corresponds to a longitudinal axis of a base plate 100 to contact a bedding plane while maintaining horizontality of the base plate 100 by using a level 300.

The strike measurement process (S20) may be a process of rotating a first case 210 of a compass 200 to move a strike scale 211 displayed on a rim of the compass 200 to a specific position and then read a strike scale indicated by a strike measurement needle 222 that rotates by a magnetic force, thereby measuring a strike angle of the bedding plane.

The strike determination process (S25) may be a process of determining the strike angle through a reflector 610 by rotating a cover 600 if the strike angle is not visualized in the strike measurement process (S20).

The vertical contact process (S30) may be a process of allowing the one side surface that corresponds to the longitudinal axis of the base plate 100 to contact the bedding plane in a direction perpendicular to the strike direction.

The dip angle measurement process (S40) may be a process for reading a dip scale 221, which is indicated by a dip measurement ball 223 that moves by the gravity within the second case 220 in which the dip scale 221 is previously fixed, as it is to measure a dip angle of the bedding plane.

The dip angle determination process (S50) may be a process of determining the dip angle through the reflector 610 by rotating the cover 600 if the dip angle is not visualized in the dip angle measurement process (S40).

Although the clinometer and the method for measuring the strike and dip angles by using the same according to the present invention are exemplified with respect to the accompanying drawings, those having ordinary skill in the art to which the present invention pertains will be understood that the present invention can be carried out in other specific forms without changing the technical idea or essential features.

According to the present invention, the dip scale may be previously fixed to the clinometer to read the dip scale, which is indicated by the dip measurement ball, as it is when the dip angle is measured, thereby easily measuring the dip angle of the stratum, and also, the dip measurement ball that moves by the gravity to measure the dip angle may be provided to improve the malfunction of the conventional dip angle measurement needle due to the friction thereof. Therefore, the clinometer and the method for measuring the strike and dip angles by using the same may be more effectively utilized in the geological investigation in the fields and sites and related industries.

The invention claimed is:

1. A clinometer comprising a base plate and a compass disposed on the base plate to measure strike and dip angles, wherein:
    the compass comprises (a) a first case rotatably disposed on the base plate to move a strike scale displayed on a rim of the compass to a specific position, and (b) a second case disposed within the first case, the second case being fixed to the base plate to previously fix a dip scale displayed on the rim of the compass at a specific position;
    the second case comprises (a) a strike measurement needle rotating a magnetic force to indicate the strike scale, and (b) a dip measurement ball moving by the gravity to indicate the dip scale; and
    the second case is filled within a transparent inducing solution that prevents the strike measurement needle from vertically moving to induce horizontal rotation of the strike measurement needle.

2. The clinometer of claim 1, wherein the dip measurement ball is formed of a copper material.

3. The clinometer of claim 1, wherein the dip scale is displayed on a semicircular rim, and
    each of both ends of a horizontal line that is perpendicular to both side surfaces that correspond to the longitudinal axis of the base plate is defined as an angle of 0°, an angle gradually increases in a direction of a lower end of a vertical line that is perpendicular to the horizontal line, and the lower end of the vertical line is defined as an angle of 90°.

4. The clinometer of claim 1, further comprising a level disposed on the base plate to adjust horizontality of the base plate.

5. The clinometer of claim 4, wherein the level is provided as a tube-type bubble tube that adjusts the horizontality of the base plate through movement of a bubble.

6. The clinometer of claim 4, further comprising
    a cover connected to an end of the base plate through a hinge to cover the compass and the level.

7. The clinometer of claim 6, wherein the cover comprises a reflector for determining the strike and dip angles measured by the compass.

8. The clinometer of claim 1, wherein rulers having divisions different from each other are displayed on both sides of the base plate, respectively.

* * * * *